United States Patent
Kim et al.

(10) Patent No.: US 6,853,425 B2
(45) Date of Patent: Feb. 8, 2005

(54) LIQUID CRYSTAL DISPLAY DEVICE AND A METHOD OF MANUFACTURING A VIEWING ANGLE COMPENSATION FILM FOR THE SAME

(75) Inventors: Do-Sung Kim, Gumi-si (KR); Seung-Jun Moon, Seoul (KR); Do-Yeon Kim, Busan (KR)

(73) Assignee: LG. Philips LCD Co., Ltd., Seoul (KR)

( * ) Notice: Subject to any disclaimer, the term of this patent is extended or adjusted under 35 U.S.C. 154(b) by 38 days.

(21) Appl. No.: 10/608,951

(22) Filed: Jun. 30, 2003

(65) Prior Publication Data

US 2004/0125295 A1 Jul. 1, 2004

(30) Foreign Application Priority Data

Dec. 28, 2002 (KR) .............................. 10-2002-0086104

(51) Int. Cl.[7] .......................................... G02F 1/1335
(52) U.S. Cl. ...................................... 349/119; 349/129
(58) Field of Search .............................. 349/117, 118, 349/119, 120, 121, 129, 130

(56) References Cited

U.S. PATENT DOCUMENTS

| | | | |
|---|---|---|---|
| 4,691,995 A | | 9/1987 | Yamazaki et al. |
| 5,309,264 A | | 5/1994 | Lien et al. |
| 5,608,556 A | | 3/1997 | Koma |
| 5,666,179 A | | 9/1997 | Koma |
| 6,768,526 B2 | * | 7/2004 | Ho et al. ...................... 349/74 |
| 6,784,961 B2 | * | 8/2004 | Suzuki et al. ............... 349/117 |
| 6,798,471 B2 | * | 9/2004 | Yamada ...................... 349/106 |
| 2003/0048400 A1 | * | 3/2003 | Kim et al. .................. 349/117 |

* cited by examiner

*Primary Examiner*—Kenneth Parker
*Assistant Examiner*—David Y. Chung
(74) *Attorney, Agent, or Firm*—McKenna Long & Aldridge LLP

(57) ABSTRACT

A liquid crystal display (LCD) device include: first and second substrates, the first and second substrates having a plurality of pixels divided into at least two domains; a liquid crystal layer between the first and the second substrates, the liquid crystal layer having a different alignment direction in each domain; and first and second compensation films on outer surfaces of the first and second substrates, the first and second compensation films having a negative refractive anisotropy and having a triangle pattern.

24 Claims, 11 Drawing Sheets

[when voltage is applied]

US 6,853,425 B2

LIQUID CRYSTAL DISPLAY DEVICE AND A METHOD OF MANUFACTURING A VIEWING ANGLE COMPENSATION FILM FOR THE SAME

This application claims the benefit of Korean Patent Application No. 2002-86104, filed on Dec. 28, 2002 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a liquid crystal display (LCD) device having a structure for improving a viewing angle and a method for manufacturing the same.

2. Discussion of the Related Art

In general, a liquid crystal display (LCD) device has upper and lower substrates spaced apart from and opposed each other, and a liquid crystal layer interposed therebetween. The upper and lower substrates respectively have an electrode thereon to form an electric field between the upper and lower substrates. The electric field formed between the upper and lower substrates aligns liquid crystal molecules so that an image can be displayed by a changing light transmittance according to an alignment of the liquid crystal molecules. Although there are many types of the liquid crystal display (LCD) devices, an active matrix liquid crystal display (LCD) device, in which film transistors and pixel electrodes connected to the thin film transistor are arranged in a matrix form, has been most widely used for the liquid crystal display (LCD) device because of its superior resolution and moving image display ability. The aforementioned liquid crystal display (LCD) device has a pixel electrode on the lower substrate and a common electrode on the upper substrate and drives liquid crystal molecules by an electric field formed perpendicular to the upper and lower substrates. Many types of liquid crystal materials are used for the liquid crystal display (LCD) device, and among them, a twisted nematic (TN) mode liquid crystal is most widely used for the liquid crystal display (LCD) device. The TN mode liquid crystal has an alignment structure of the liquid crystal molecules in which every liquid crystal molecule is aligned parallel to the upper and lower substrates and the liquid crystal molecule close to the upper substrate and the molecule close to the lower substrate are twisted 90° (degree) with respect to the upper and lower substrates when voltage is not applied to the liquid crystal molecules. In addition, the liquid crystal display (LCD) device usually has a single domain structure of the liquid crystal in which the liquid crystal molecules for each a sub-pixel has the same alignment characteristics.

FIG. 1A is a plan view of a related art TN (twisted nematic) mode liquid crystal display (LCD) device having a single domain structure, and FIG. 1B is a cross-sectional view taken along a line "I—I" in FIG. 1A. In FIG. 1A, a gate line 12 is formed in a first direction and a data line 22 is formed in a second direction. The gate and data lines 12 and 22 define a pixel region "P" by crossing each other, and a thin film transistor is formed near a crossing portion of the gate and data lines 12 and 22. A pixel electrode 26 connected to the thin film transistor is formed in the pixel region "P". A solid arrow line and a dotted arrow line in the pixel region "P" respectively illustrates rubbing directions of upper and lower alignment layers formed respectively on the upper and lower substrates. The upper and lower alignment layers are rubbed substantially perpendicularly to each other and the pixel region "P" is not divided. (I.e., there is a single domain of liquid crystal alignment direction when an electric field is applied). In FIG. 1B, the first and second substrates 30 and 50 are spaced apart from and opposed each other. A thin film transistor "T" and a pixel electrode 26 connected to the thin film transistor "T" are formed on the first substrate 30. A first alignment layer 28 is formed on the first substrate 30 on which the thin film transistor "T" and the pixel electrode 26 are already formed. A black matrix 52 corresponding to the thin film transistor "T" is formed on an inner surface of the second substrate 50 and a color filter 54 is formed on the black matrix 52 and second substrate 50. A common electrode 56 is formed on the color filter 54 and a second alignment layer 58 is formed on the common electrode 56. A layer 70 of TN (twisted nematic) mode liquid crystal is disposed between the first and second substrates 30 and 50. As discussed previously because the first alignment layer 28 is rubbed in a perpendicular direction to a rubbing direction of the second alignment layer 58, the TN mode liquid crystal has a 90° (degree) twisted structure when voltage is not applied to the pixel and common electrodes 26 and 56. As illustrated in FIG. 1B, the liquid crystal molecules 72 are aligned perpendicular to the first and second substrates 30 and 50 when the voltage is applied to the pixel and common electrodes 26 and 56. Thus the liquid crystal layer 70 serves as a light shutter for a light source (not shown). In the liquid crystal display (LCD) device having the TN mode liquid crystal, there is a difference between light intensity L1 controlled by a long axis of the liquid crystal molecules 72 and light intensity L2 controlled by a short axis of the liquid crystal molecules 72 as a viewing angle of an observer changes. Accordingly, a viewing angle property of the liquid crystal display (LCD) device is not good and thus the observer perceives that a luminance of the liquid crystal display (LCD) device is not uniform. To overcome aforementioned problem, a liquid crystal display (LCD) device having a multi-domain structure in which a sub-pixel or a pixel is divided to align the liquid crystal molecules symmetrically. In general, a multi-domain structure for the TN mode liquid crystal display (LCD) device is formed by controlling a rubbing direction of the alignment layer or forming an abnormal electric field. According to the latter method for forming the multi-domain structure, an alignment of the liquid crystal molecules can be stabilized in the multi-domain structure by forming a fringe field by the abnormal electric field.

FIG. 2A is a plan view of a related art TN (twisted nematic) mode liquid crystal display (LCD) device having a two-domain structure, and FIG. 2B is a cross-sectional view taken along a line "II—II" in FIG. 2A. In FIG. 2A, two domains are formed in a pixel region "P" by controlling a rubbing direction and explanations about the same elements as those in FIG. 1A will be omitted for the sake of explanation. In FIG. 2A, gate and data lines 112 and 122 define a pixel region "P" by crossing each other, and first and second domains "IIIa" and "IIIb" are formed in the pixel region "P". The two-domain structure can be formed by controlling the rubbing direction of the first and second alignment layers (not shown) as aforementioned. In FIG. 2B, the rubbing direction of the first and second alignment layers 128 and 158 in the first domain "IIIa" and the rubbing direction of the first and second alignment layers 128 and 158 in the second domain "IIIb" are symmetric about a boundary between first and second domains "IIIa" and "IIIb," as illustrated in FIG. 2A. Accordingly, liquid crystal molecules 172 in the first domain "IIIa" and liquid crystal molecules in the second domain "IIIb" are aligned symmetrically to each other about the boundary between the first and second domains "IIIa" and "IIIb". As a result, a light intensity L11 controlled by a long axis of the liquid crystal molecule in the first domain "IIIa" and a light intensity L22 controlled by a long axis of the liquid crystal molecule in the second domain "IIIb" becomes similar to each other and so that a viewing angle can be improved. However, in the aforementioned method for dividing the sub-pixel or the pixel to have the multi-domain structure by controlling the rubbing direction of the alignment layer, properties of the divided domains depend on a rubbing property of the alignment layer. Accordingly, a minor defect in rubbing may produce a defective liquid crystal display (LCD) device.

SUMMARY OF THE INVENTION

Accordingly, the present invention is directed to an array substrate for a liquid crystal display (LCD) device that substantially obviates one or more of problems due to limitations and disadvantages of the related art.

An advantage of the present invention is to provide a liquid crystal display (LCD) device having a stable multi-domain structure and an improved viewing angle by forming first and second compensation films that have a plurality of triangle patterns and includes a material having a negative anisotropy of refractive index respectively on outer surfaces of first and second substrates.

Another advantage of the present invention is to provide a method for manufacturing a viewing angle compensation film for a liquid crystal display (LCD) device by pressing a compensation film material including a material having a negative anisotropy of refractive index with a patterned mask having a plurality of triangle patterns.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device includes first and second substrates, the first and second substrates having a plurality of pixels divided into at least two domains; a liquid crystal layer between the first and the second substrates, the liquid crystal layer having a different alignment direction in each domain; and first and second compensation films on outer surfaces of the first and second substrates, respectively, the first and second compensation films having a negative refractive anisotropy and each having a cross section having a triangle pattern.

In another embodiment of the present invention, a liquid crystal display (LCD) device includes first and second substrates, the first and second substrates having a plurality of pixels divided into at least two domains; a liquid crystal layer between the first and the second substrates, the liquid crystal layer having a different alignment direction in each domain; a first compensation film on an outer surface of the first substrate, the first compensation film having an upper surface and a lower surface; and a second compensation film on an outer surface of the second substrate, the second compensation film having an upper surface and a lower surface, the first and second compensation films having a negative refractive anisotropy; wherein at least one of the first compensation film upper surface and lower surface and at least one of the second compensation film upper surface and lower surface has a triangular cross section.

A method for manufacturing a viewing angle compensation film for a liquid crystal display (LCD) device includes: forming a compensation film material having a negative refractive anisotropy; forming a patterned mask on the compensation film material, the patterned mask having a plurality of triangle patterns; and forming a plurality of triangle patterns on the compensation film material by pressing the compensation film material with the patterned mask.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1A:
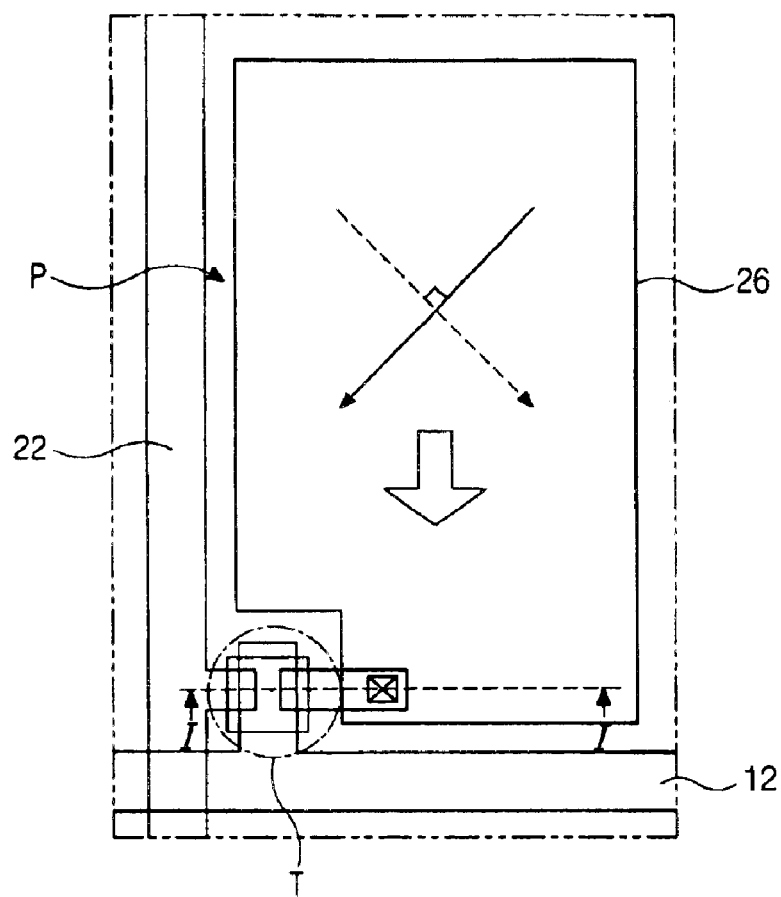
FIG. 1A is a plan view of a related art TN (twisted nematic) mode liquid crystal display (LCD) device having a single domain structure.
Figure 1B:
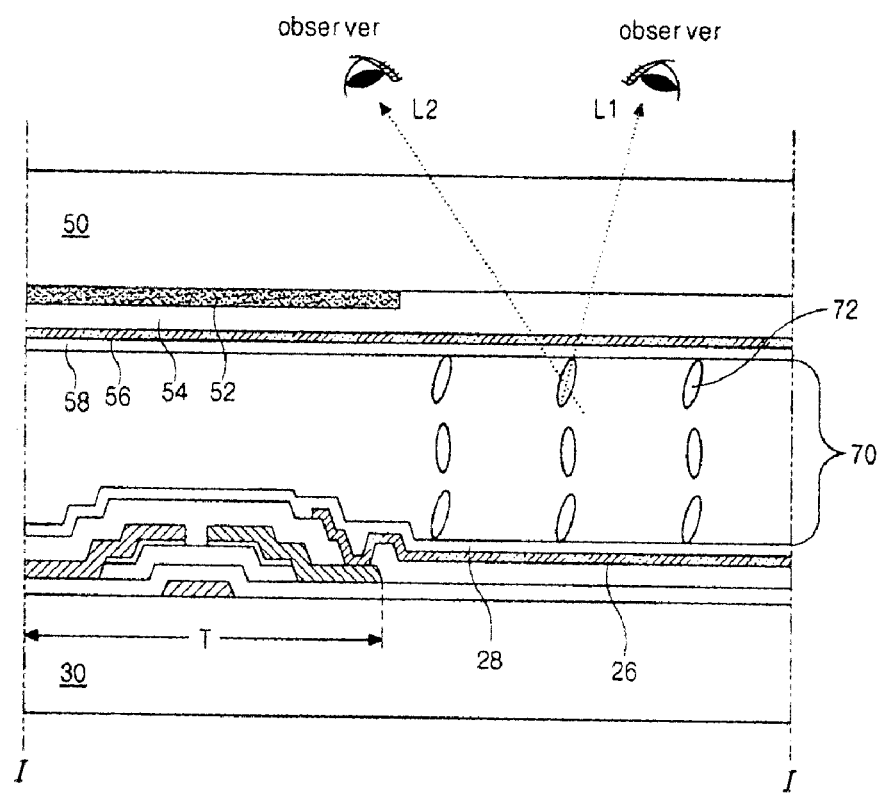
FIG. 1B is a cross-sectional view taken along a line "I—I" in FIG. 1A.
Figure 2A:
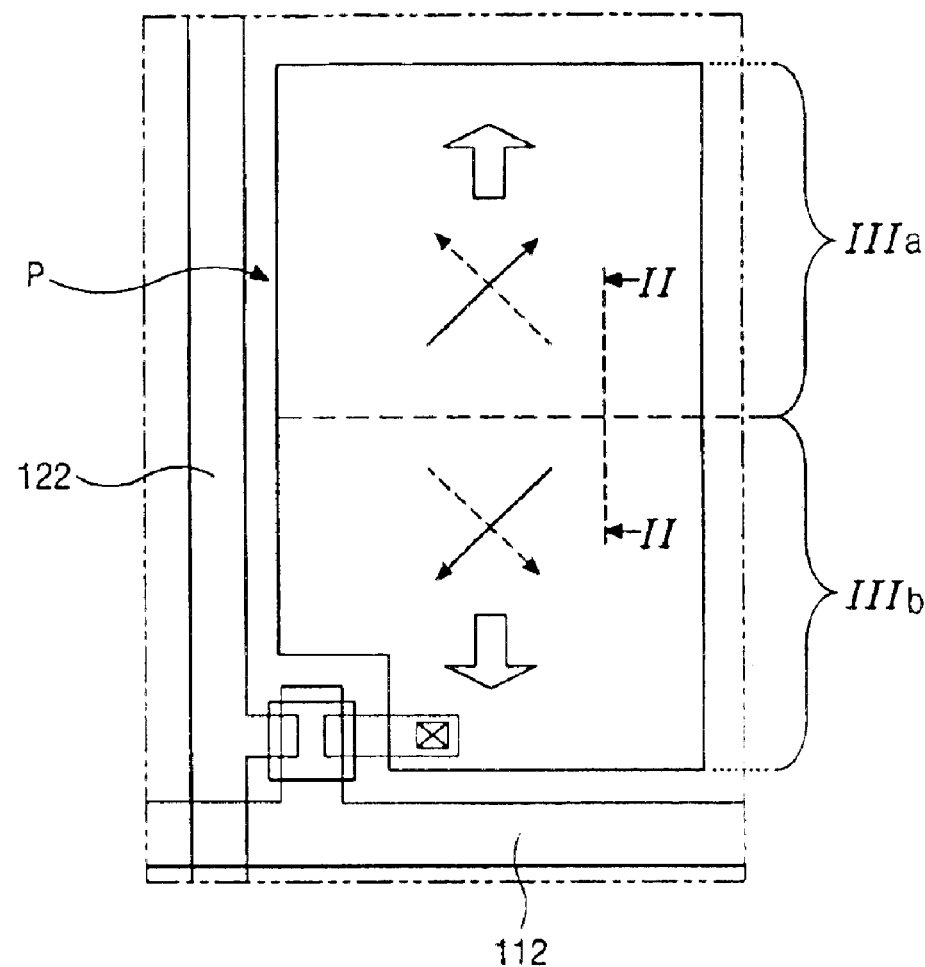
FIG. 2A is a plan view of a related art TN (twisted nematic) mode liquid crystal display (LCD) device having a two-domain structure.
Figure 2B:
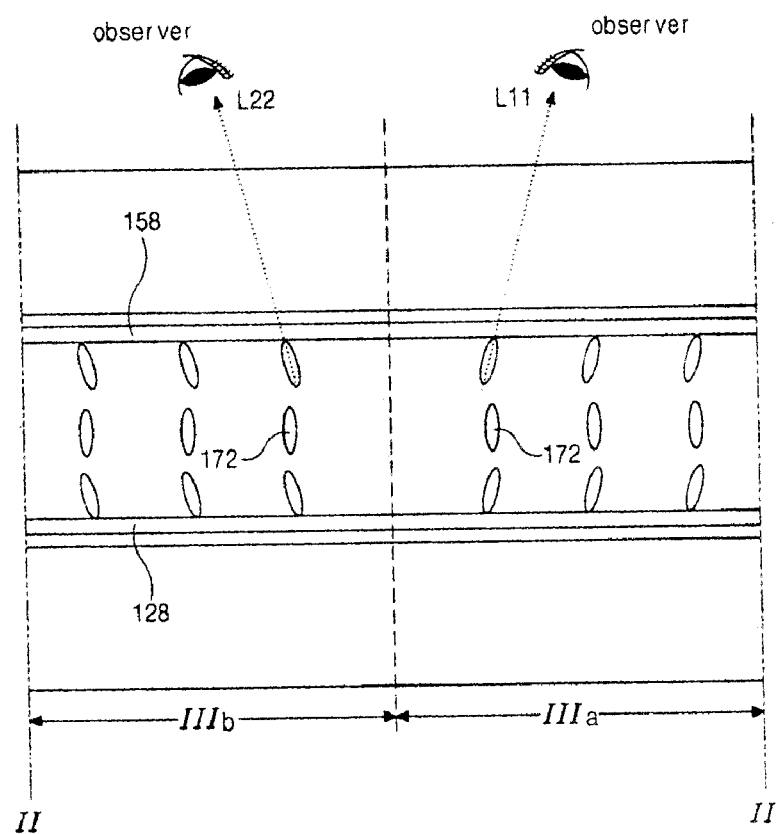
FIG. 2B is a cross-sectional view taken along a line "II—II" in FIG. 2A.
Figure 3:
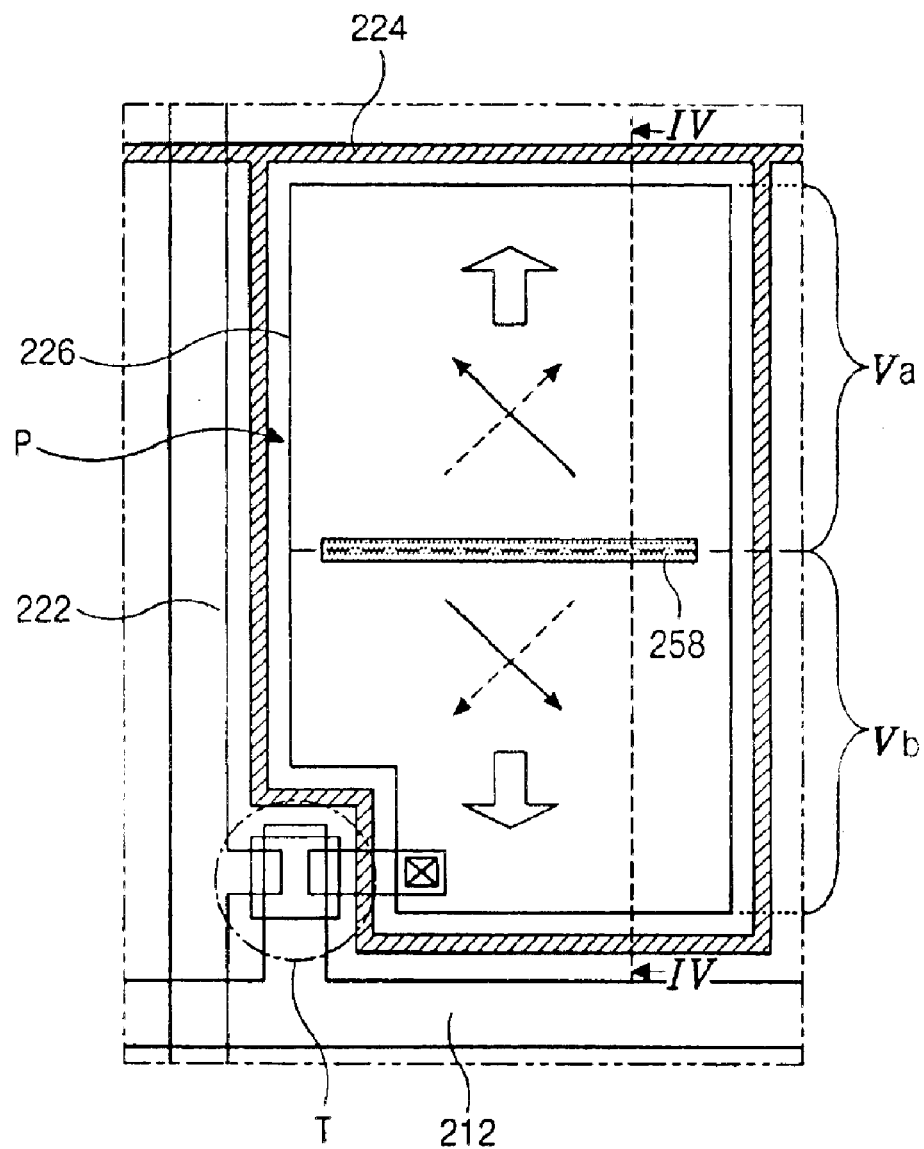
FIG. 3 is a plan view of a liquid crystal display (LCD) device having a two-domain structure according to a first embodiment of the present invention.

FIG. 3 is a plan view of a liquid crystal display (LCD) device having a two-domain structure according to a first embodiment of the present invention. In FIG. 3, a gate line 212 is formed in a first direction and a data line 222 is formed in a second direction substantially perpendicular to the first direction. The gate and data lines 212 and 222 define a pixel region "P" by crossing each other. A thin film transistor "T" is formed at a crossing portion of the gate and data lines 212 and 222. A pixel electrode 226 connected to the thin film transistor "T" is formed in the pixel region "P". In addition, an auxiliary electrode 224 is formed around the pixel electrode 226 in the pixel region "P". That is, the pixel region "P" may be defined as a region substantially enclosed by the auxiliary electrode 224. The auxiliary electrode 224 is spaced apart from the adjacent gate line 212, the data line 222 and the pixel electrode 226. However, the auxiliary electrode 224 may be partially overlapped with the gate line 212, the data line 222 and the pixel electrode 226 with an insulating layer between the auxiliary electrode 224 and the gate line 212, the data line 222 or the pixel electrode 226. The auxiliary electrode 224 maximizes a formation of an abnormal electric field by inducing a fringe field between the pixel electrode 226 and the auxiliary electrode 224 to provide an effect of a domain division. In addition, a projected pattern 258 is formed at middle portion in the pixel region "P" in the first direction. The projected pattern 258 may be formed on a substrate having the pixel electrode 226 or formed on a different substrate opposing the substrate having the pixel electrode 226. The projected pattern 258 forms an abnormal electric field so that the pixel region "P" is divided into first and second domains "Va" and "Vb" with respect to the projected pattern 258. To maximize the formation of the abnormal electric field by the projected pattern 258, liquid crystals in the first and second domains "Va" and "Vb" are processed to make directors of the liquid crystals face outward directions.

Figure 4:
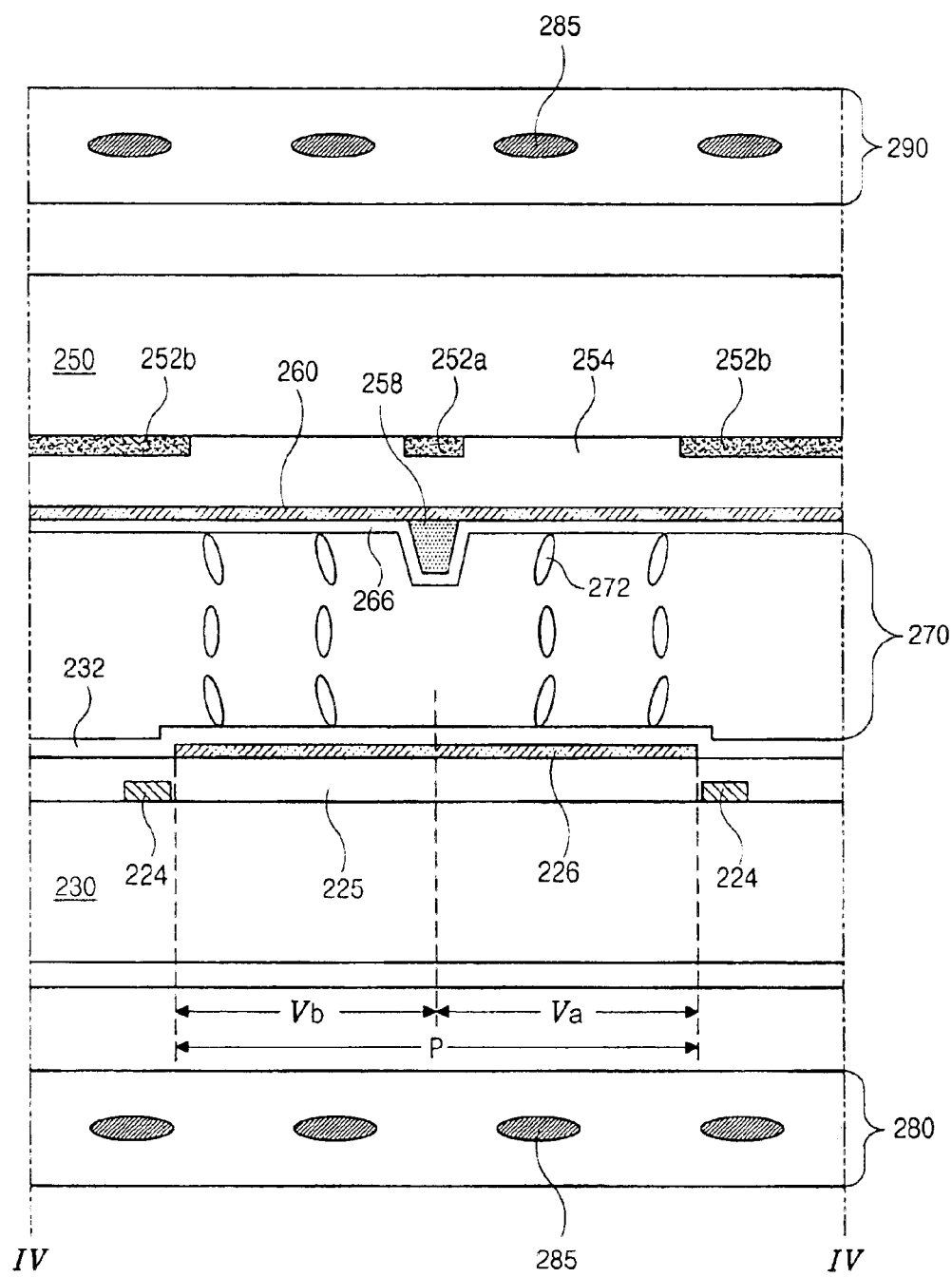
FIG. 4 is a cross-sectional view taken along a line "IV—IV" in FIG. 3.

FIG. 4 is a cross-sectional view taken along a line "IV—IV" in FIG. 3. In FIG. 4, first and second substrates 230 and 250 having a pixel region "P" defined thereon are spaced apart from and opposed each other. The auxiliary electrode 224 is formed at a peripheral portion of the pixel region "P" on the first substrate 230 and an insulating layer 225 is formed on the first substrate 230 on which the auxiliary electrode 224 is formed. The pixel electrode 226 is formed on the insulating layer 225 in the pixel region "P," and a first alignment layer 232 is formed on the first substrate on which the pixel electrode 226 is formed. A first black matrix pattern 252a is formed on an inner surface of a second substrate 250 at a center portion of the pixel region "P" and second black matrix patterns 252b are spaced apart from the first black matrix pattern 252a. A color filter 254 covering the first and second black matrix patterns 252a and 252b is formed on the second substrate 250, and a common electrode 260 is formed on the color filter 254. The projected pattern 258 is formed on the common electrode 260 corresponding to the first black matrix pattern 252a and a second alignment layer 266 is formed on the second substrate 250 on which the projected pattern 258 is formed. A liquid crystal layer 270 is disposed between the first and second alignment layers 232 and 266. The liquid crystal molecules in the first and second domains "Va" and "Vb" have different alignments owing to the formation of the abnormal electric field by the projected pattern 258 and the auxiliary electrode 224. The liquid crystal molecules in the first domain "Va" are aligned symmetrically to the liquid crystal molecules in the second domain "Vb". Because the abnormal electric field is formed near the projected pattern 258, the liquid crystal molecules 272 near the projected pattern 258 are not aligned exactly perpendicular to the first and second substrates 230 and 250 but slightly leaned to left or right. First and second compensation films 280 and 290 are formed respectively on outer surfaces of the first and second substrates 230 and 250 to improve a viewing angle. Because the liquid crystal layer 270 has a positive anisotropy of a refractive index, the first and second compensation films 280 and 290 must have a negative anisotropy of a refractive index to make compensation effect. An alignment of TN mode liquid crystal molecules produces differences of light intensity as a viewing angle changes and so that tilt angles of discotic liquid crystal molecules 285 in the first and second compensation films 280 and 290 are fixed at about 0° (degree). However, in the case of a normally white mode, for example, because a main viewing angle of the first domain "Va" is different from a main viewing angle of the second domain "Vb" as illustrated in FIG. 3, a light leakage phenomenon is observed when the second domain "Vb" is observed in a direction of the main viewing angle of the first domain "Va". In addition, an average tilt angle of the TN mode liquid crystal molecules 272 is about 80° (degree) when voltage is applied to the pixel and common electrodes 226 and 260. Accordingly, if the tilt angles of the discotic liquid crystal molecules in the first and second compensation films 280 and 290 are fixed at 0° (degree), the liquid crystal display (LCD) device can have a viewing angle of above 160° (degree) in a horizontal direction but have a viewing angle of below 100° (degree) in a vertical direction.

Figure 5:
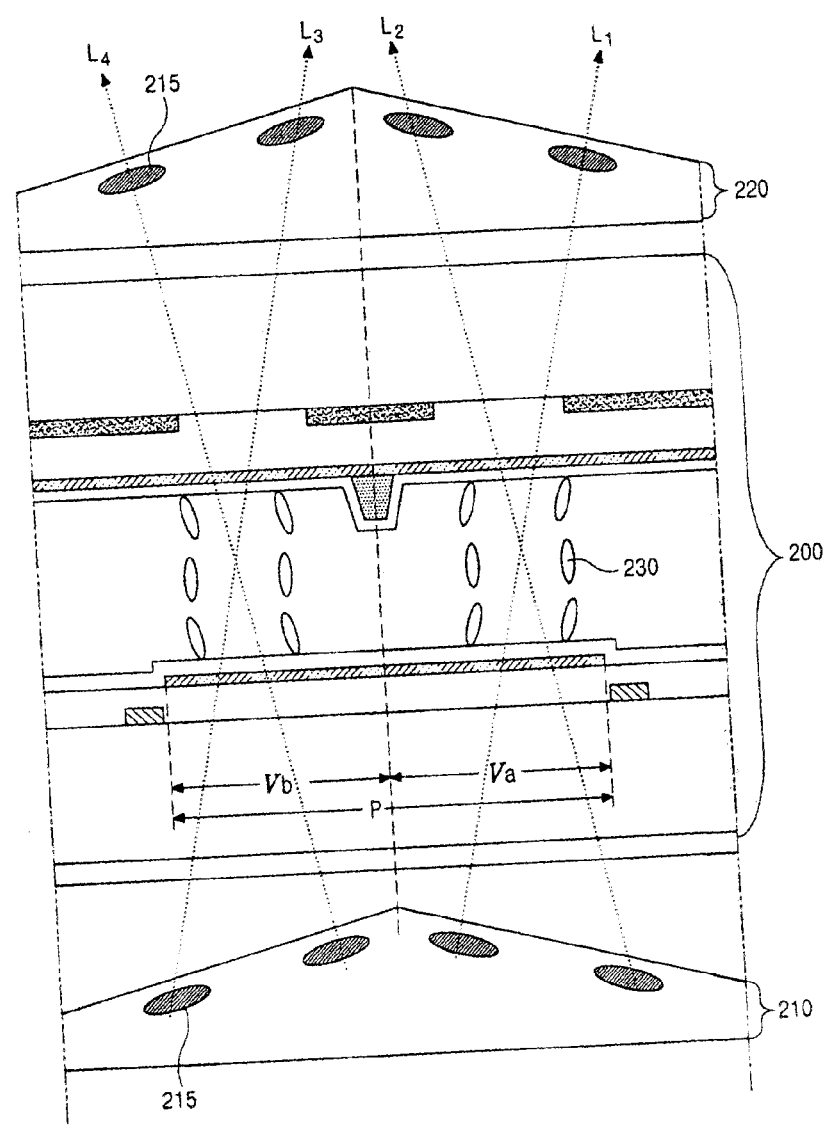
FIG. 5 is a cross-sectional view of a liquid crystal display (LCD) device having a two-domain structure and a compensation film according to a second embodiment of the present invention.

FIG. 5 is a cross-sectional view of a liquid crystal display (LCD) device having a two-domain structure and a compensation film according to a second embodiment of the present invention. An explanation about the same elements as those in FIG. 4 will be omitted for convenience of explanation. In FIG. 5, first and second compensation films 210 and 220 are formed respectively on outer surfaces of a liquid crystal display panel 200 having a two-domain structure. The first and second compensation films 210 and 220 respectively have oblique side having a certain angle with respect to a bottom surface of the first and second compensation films 210 and 220, and discotic liquid crystal molecules 215 in the first and second compensation films 210 and 220 are arranged along the oblique sides of the first and second compensation films 210 and 220. As illustrated in FIG. 5, the first and second compensation films 210 and 220, respectively, have a shape of an isosceles triangle and vertices 210a and 220a of the first and second compensation films 210 and 220 correspond to a boundary between a first domain "Va" and a second domain "Vb". Tilt angles of the discotic liquid crystal molecules are controlled to be between about ±3° (degree) and about ±10° (degree) to produce an actual compensation effect of the viewing angle. Accordingly, the viewing angle of the liquid crystal display (LCD) device can be greatly improved in every direction such as $L_1$, $L_2$, $L_3$ and $L_4$, as illustrated in FIG. 5 by a combination of the tilted discotic liquid crystal molecules 215 and liquid crystal molecules 230 of the liquid crystal display panel 200. The isosceles triangle sides of the first and second compensation films 210 and 220 face the same direction. That is, the vertex of the first compensation film 210 points toward to a lower substrate of the liquid crystal display panel 200 and the vertex of the second compensation film 220 points away from the upper substrate of the liquid crystal display panel. Though not illustrated in FIG. 5, a backlight is disposed behind the first compensation film 210 for a light source.

Figure 6A:
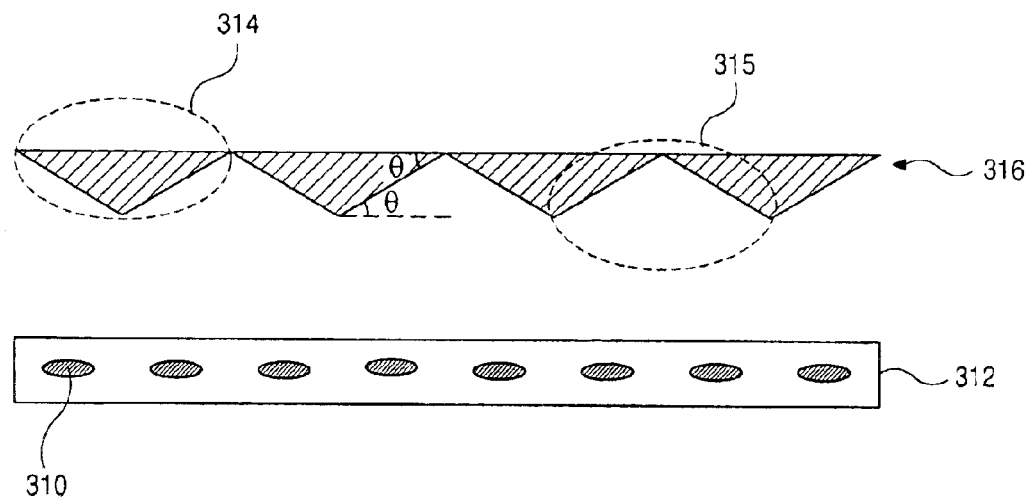
FIGS. 6A and 6B illustrate a fabrication sequence of a compensation film according to the present invention.
Figure 6B:
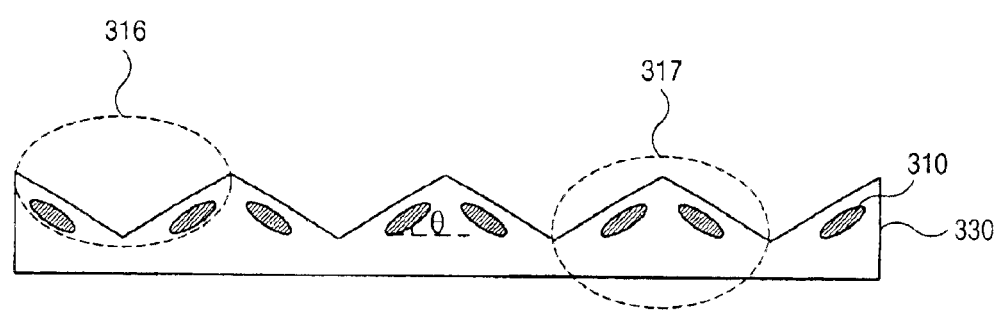

FIGS. 6A and 6B illustrate a fabrication sequence of the compensation films in FIG. 5 according to the present invention. In FIG. 6A, discotic liquid crystal 310 having a tilt angle of about 0° (degree) is included in an original compensation film material 312. A patterned mask 316 (or a metal pattern) having a plurality of triangle patterns 314 connected to each other is disposed over the original compensation film material 312. The triangle patterns 314 maybe an isosceles triangle and a figure 315 between one triangle pattern and a next triangle pattern also may be an isosceles triangle. The patterned mask 316 is disposed over the original compensation film material 312 in a way that a vertex of the triangle pattern 314 faces the original compensation film material 312. An angle "θ" between a side of the triangle pattern 314 and the base of the triangle pattern is desirably between about ±0° (degree) and about ±15° (degree). In FIG. 6B, a desired compensation film 330 whose top portion has a plurality of triangle patterns 317 is completed by disposing the patterned mask 316 on the original compensation film material 312 and then pressing it. In FIG. 6B, portions 316 and 317 correspond to the triangle pattern 314 and the figure 315 in FIG. 6A. After the pressing process of the original compensation film material 312, the discotic liquid crystal 310 aligns along a side of the triangle pattern 317 of the compensation film 330. Accordingly, the discotic liquid crystal 310 has a tile angle "θ" between about ±0° (degree) and about ±15° (degree) corresponding to the angle between the side of the triangle pattern 314 and the base of the triangle pattern 314. A vertex of the triangle pattern 317 of the compensation film 330 corresponds to a boundary between two domains and one side of the triangle pattern 317 corresponds to one domain, as illustrated in FIG. 5. As mentioned hereto, in one aspect of the present invention, the compensation film material including the discotic liquid crystal is used for forming the compensation film. However, the compensation film may alternatively be formed of material having a negative anisotropy of refraction index instead of the material having the discotic liquid crystal in it.

Figure 7:
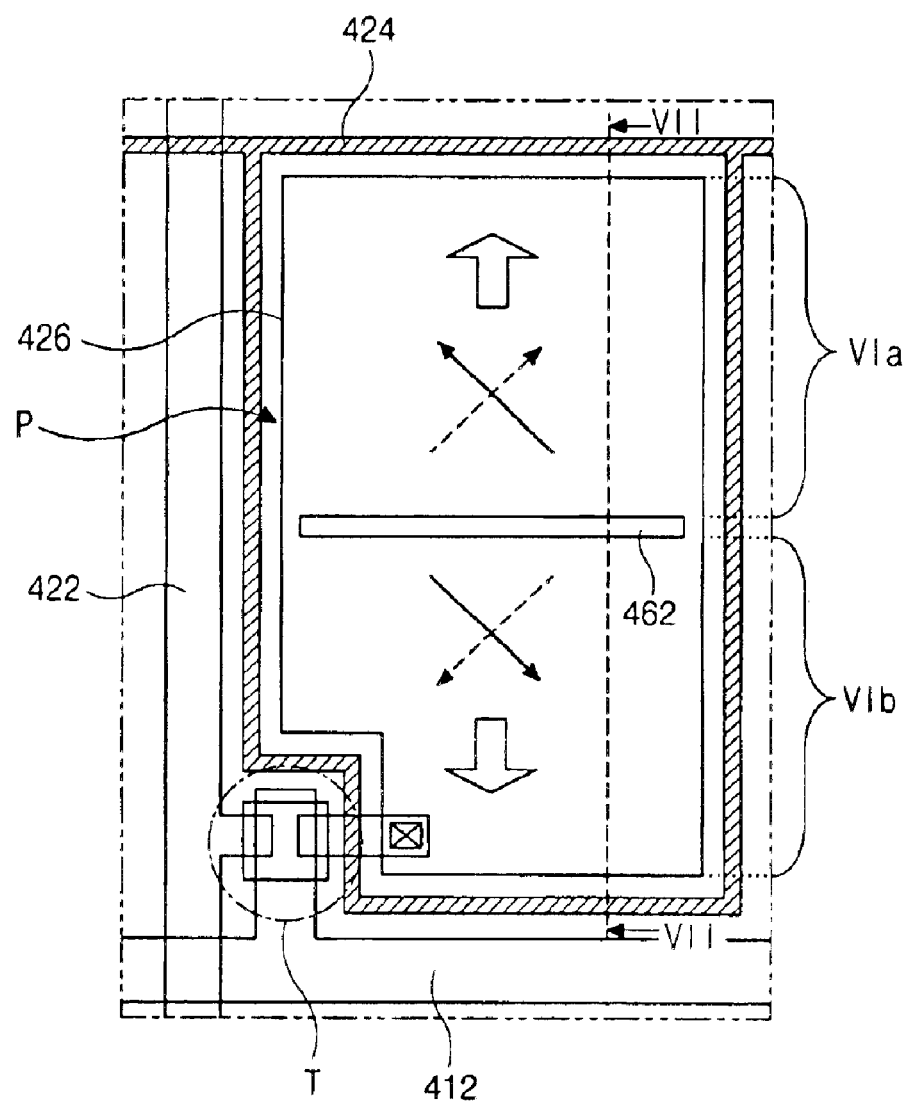
FIG. 7 is a plan view of a liquid crystal display (LCD) device having a two-domain structure according to a third embodiment of the present invention.

FIG. 7 is a plan view of a liquid crystal display (LCD) device having a two-domain structure according to a third embodiment of the present invention. In FIG. 7, a gate line 412 is formed in a first direction and a data line 422 is formed in a second direction substantially perpendicular to the first direction. The gate and data lines 412 and 422 define a pixel region "P" by crossing each other. A thin film transistor "T" is formed at a crossing portion of the gate and data lines 412 and 422. A pixel electrode 426 connected to the thin film transistor "T" is formed in the pixel region "P". In addition, an auxiliary electrode 424 is formed around the pixel electrode 426 in the pixel region "P". That is, the pixel region "P" may be defined as a region substantially enclosed by the auxiliary electrode 424. The auxiliary electrode 424 is spaced apart from the adjacent gate line 412, the data line 422 and the pixel electrode 426. However, the auxiliary electrode 424 may be partially overlapped with the gate line 412, the data line 422 and the pixel electrode 426 with an insulating layer between the auxiliary electrode 424 and the gate line 412, the data line 422 or the pixel electrode 426. The auxiliary electrode 424 maximizes a formation of an abnormal electric field by inducing a fringe field between the pixel electrode 426 and the auxiliary electrode 424 to provide an effect of a domain division. In addition, in the present embodiment, a slit 462 may be formed in the pixel electrode 426 to form an abnormal elective field so that the pixel region "P" is divided into first and second domains "VIa" and "VIb" with respect to the slit 462. In one aspect, the slit 462 may be formed at a middle portion of the pixel electrode 426 to substantially divide the pixel electrode 426 into two separate regions 426a and 426b, as illustrated in FIG. 7.

To further enhance the abnormal electric field according to another aspect of the present invention, a projected pattern 458 may be formed at middle portion in the pixel region "P" in the first direction and may correspond to the slit 462 formed in the pixel electrode. The projected pattern 458 may be formed on a substrate having the pixel electrode 426 or formed on a different substrate opposing the substrate having the pixel electrode 426. In another aspect of the present invention, although not shown, the projected pattern 458 may be formed on either substrate in a configuration on to correspond to the slit 462 in the pixel electrode 426 so that the pixel region "P" is divided multiple domains with respect to the projected pattern 458 and the slit 462. To maximize the formation of the abnormal electric field by the projected pattern 458 or the slit 462, liquid crystals in the first and second domains "VIa" and "VIb" may be processed to make directors of the liquid crystals face outward directions.

Figure 8:
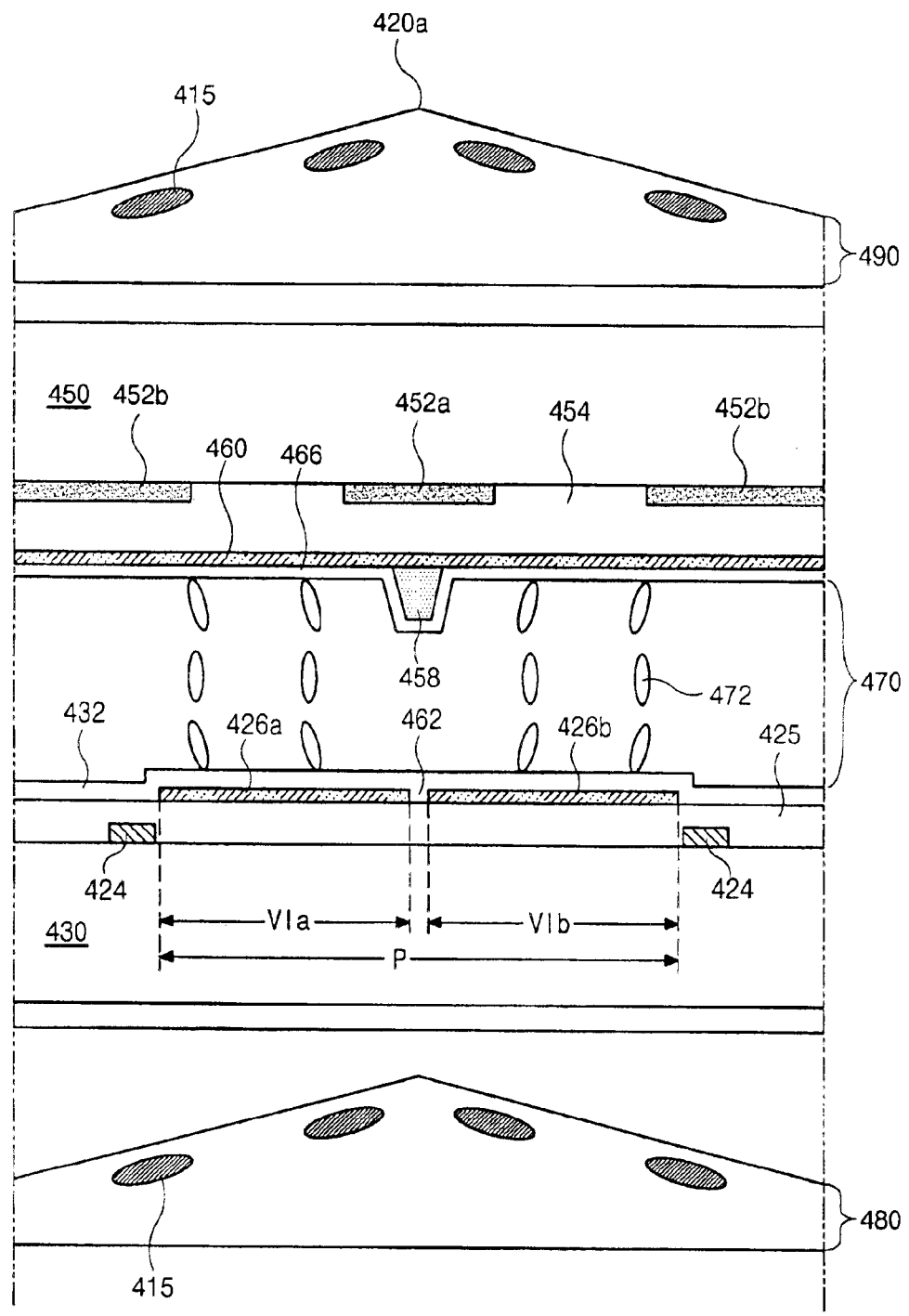
FIG. 8 is a cross-sectional view taken along a line "VII—VII" in FIG. 7.

FIG. 8 is a cross-sectional view taken along a line "VII—VII" in FIG. 7. In FIG. 8, first and second substrates 430 and 450 having a pixel region "P" defined thereon are spaced apart from and opposed each other. The auxiliary electrode 424 is formed at a peripheral portion of the pixel region "P" on the first substrate 430 and an insulating layer 425 is formed on the first substrate 430 on which the auxiliary electrode 424 is formed. The pixel electrode 426 is formed on the insulating layer 425 in the pixel region "P," and a first alignment layer 432 is formed on the first substrate on which the pixel electrode 426 is formed. A first black matrix pattern 452a is formed on an inner surface of a second substrate 450 at a center portion of the pixel region "P" and second black matrix patterns 452b are spaced apart from the first black matrix pattern 452a. A color filter 454 covering the first and second black matrix patterns 452a and 452b is formed on the second substrate 450, and a common electrode 460 is formed on the color filter 454. The projected pattern 458 is formed on the common electrode 460 corresponding to the first black matrix pattern 452a and a second alignment layer 466 is formed on the second substrate 450 on which the projected pattern 458 is formed. A liquid crystal layer 470 is disposed between the first and second alignment layers 432 and 466. The liquid crystal molecules in the first and second domains "VIa" and "VIb" have different alignments owing to the formation of the abnormal electric field by the projected pattern 458, the slit 462 and the auxiliary electrode 424. The liquid crystal molecules in the first domain "VIa" are aligned symmetrically to the liquid crystal molecules in the second domain "VIb". Because the abnormal electric field is formed near the projected pattern 458 and the slit 462, the liquid crystal molecules 472 near the projected pattern 458 are not aligned exactly perpendicular to the first and second substrates 430 and 450 but slightly leaned to left or right. First and second compensation films 480 and 490 are formed respectively on outer surfaces of the first and second substrates 430 and 450 to improve a viewing angle. Because the liquid crystal molecules 472 have positive anisotropy of a refractive index, the first and second compensation films 480 and 490 must have a negative anisotropy of a refractive index to make compensation effect. An alignment of TN mode liquid crystal molecules produces differences of light intensity as a viewing angle changes and so that tilt angles of discotic liquid crystal molecules 415 in the first and second compensation films 480 and 490 are fixed at about 0° to 10° (degrees). However, in the case of a normally white mode, for example, because a main viewing angle of the first domain "VIa" is different from a main viewing angle of the second domain "VIb" as illustrated in FIG. 7, a light leakage phenomenon is observed when the second domain "VIb" is observed in a direction of the main viewing angle of the first domain "VIa". In addition, an average tilt angle of the TN mode liquid crystal molecules 472 is about 80° (degree) when voltage is applied to the pixel and common electrodes 426 and 460. Accordingly, if the tilt angles of the discotic liquid crystal molecules in the first and second compensation films 480 and 490 are fixed at 0° (degree), the liquid crystal display (LCD) device can have a viewing angle of above 160° (degree) in a horizontal direction but have a viewing angle of below 100° (degree) in a vertical direction.

Figure 9:
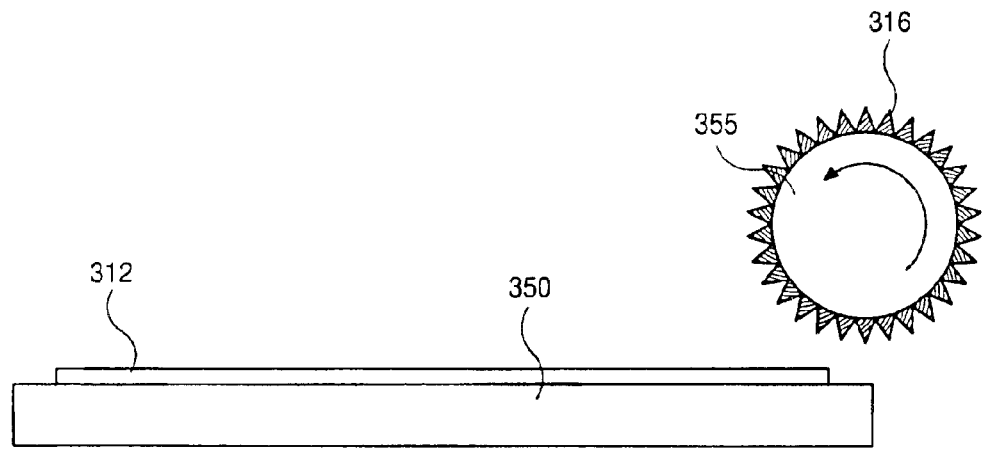
FIG. 9 illustrates a roll printing method for forming a patterned mask.

The patterned mask 316 having a triangle pattern 317 illustrated in FIG. 6B may be formed on the compensation film by a roll printing method. FIG. 9 illustrates a roll printing method for forming the patterned mask 316 having a triangle pattern 317. As illustrated, the original compensation film material 312 may be placed on a platform or substrate 350. A roller 355 having a pattern mask 316 attached thereto may be rolled over the surface of the original compensation material 312 to impart a triangle pattern such that a vertex of the triangle pattern faces the original compensation film material 312. Referring again to FIG. 6A, an angle "θ" between a side of the triangle pattern 314 and the base of the triangle pattern is desirably between about ±0° (degree) and about ±15° (degree). The triangle patterns 314 may be an isosceles triangle and a figure 315 between one triangle pattern and a next triangle pattern also may be an isosceles triangle.

Figure 10:
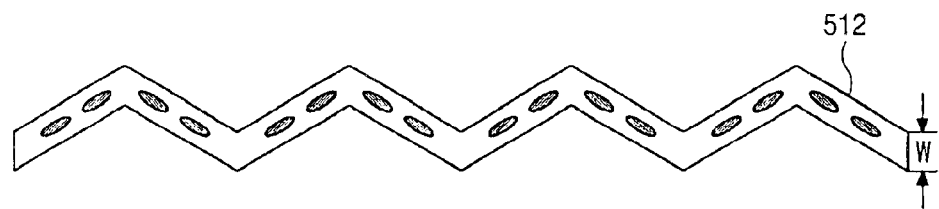
FIG. 10 illustrates a compensation film having a constant thickness, while the cross sections of the surfaces of the compensation film are triangular.

In another embodiment of the present invention, as illustrated in FIG. 10, the compensation film 512 may have a constant thickness w, while the cross sections of the surfaces of the compensation film are triangular. That is, the compensation film itself has an "V" shape with respect to the pixel region, wherein the vertex of the "V" corresponds to the boundary of the two domains. The alignment of the long axes of the discotic liquid crystal in the compensation film is substantially parallel to the surface of the compensation film.

Figure 11:
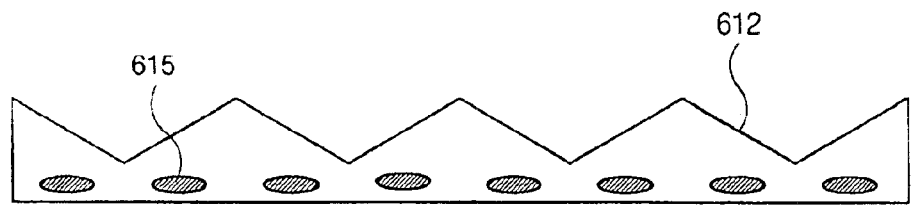
FIG. 11 illustrates a discotic liquid crystal in a compensation film having a 0° tilt angle with respect to the surface of the substrates, according to one aspect of the present invention

As described hereto, because the tilt angle of the discotic liquid crystal includes in the compensation film can be controlled according to an average tilt angle of the TN mode liquid crystal between the first and second substrates, an effective compensation for the viewing angle is possible and the viewing angle can be improved in every direction. As illustrated in FIG. 11, the discotic liquid crystal 615 in the compensation film 612 may have a 0° tilt angle with respect to the surface of the substrates.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   first and second substrates, the first and second substrates having a plurality of pixels divided into at least two domains;
   a liquid crystal layer between the first and the second substrates, the liquid crystal layer having a different alignment direction in each domain; and
   first and second compensation films on outer surfaces of the first and second substrates, respectively, the first and second compensation films having a negative refractive anisotropy and each having a cross section having a triangle pattern.

2. The device of claim 1, wherein the triangle pattern includes an isosceles triangle.

3. The device of claim 1, wherein the first and second compensation films include a discotic liquid crystal.

4. The device of claim 3, wherein the discotic liquid crystal has a tilt angle corresponding to an angle between a side and the base of the triangle pattern.

5. The device of claim 4, wherein the liquid crystal layer includes TN (twisted nematic) mode liquid crystal molecules, and the discotic liquid crystal has a tilt angle between about ±0° (degree) and about ±15° (degree).

6. The device of claim 1, wherein the pixel has two domains and a vertex of the triangle pattern corresponds to a boundary between the two domains.

7. The device of claim 1, wherein the first substrate includes:
   gate and data lines crossing each other;
   a thin film transistor at a crossing portion of the gate and data lines;
   a pixel electrode connected to the thin film transistor;
   an auxiliary electrode substantially surrounding the pixel electrode; and
   a first alignment layer covering the pixel electrode.

8. The device of claim 1, wherein the second substrate includes:
   a common electrode;
   a protrusion on the common electrode at a boundary between the two domains; and
   an alignment layer covering the common electrode and the protrusion.

9. The device of claim 1, further comprising:
   a common electrode on the second substrate;
   a pixel electrode on the first substrate, the pixel electrode having a slit therein; and
   protrusions on the common electrode corresponding to edges of the pixel electrode on the first substrate.

10. The device of claim 9, wherein the slit corresponds to a boundary between the two domains.

11. The device of claim 6, wherein the second substrate includes:
   a common electrode;
   a protrusion on the common electrode at a boundary between the two domains; and
   a second alignment layer covering the common electrode and the protrusion.

12. A method for manufacturing a viewing angle compensation film for a liquid crystal display (LCD) device, comprising:
   forming a compensation film material having a negative refractive anisotropy;
   forming a patterned mask on the compensation film material, the patterned mask having a plurality of triangle patterns; and
   forming a plurality of triangle patterns on the compensation film material by pressing the compensation film material against the patterned mask.

13. The method of claim 12, wherein the triangle pattern includes an isosceles triangle.

14. The method of claim 12, wherein the patterned mask includes a metal.

15. The method of claim 12, wherein the compensation film material is formed of a discotic liquid crystal.

16. The method of claim 15, wherein the discotic liquid crystal has a tilt angle corresponding to an angle between a side and a base of the triangle pattern.

17. The method of claim 15, wherein the discotic liquid crystal has a tilt angle between about ±0° (degree) and about ±15° (degree).

18. The method of claim 12, wherein the plurality of triangle patterns is formed in the patterned mask and the patterned mask is disposed on the surface of the compensation film material facing a vertex of the triangle pattern.

19. A liquid crystal display (LCD) device, comprising:
first and second substrates, the first and second substrates having a plurality of pixels divided into at least two domains;
a liquid crystal layer between the first and the second substrates, the liquid crystal layer having a different alignment direction in each domain;
a first compensation film on an outer surface of the first substrate, the first compensation film having an upper surface and a lower surface; and
a second compensation film on an outer surface of the second substrate, the second compensation film having an upper surface and a lower surface, the first and second compensation films having a negative refractive anisotropy;
wherein at least one of the first compensation film upper surface and lower surface and at least one of the second compensation film upper surface and lower surface has a triangular cross section.

20. The liquid crystal display device of claim 19, wherein the first compensation film upper surface and the second compensation film upper surface have triangular cross sections.

21. The liquid crystal display device of claim 19, wherein the first compensation film upper surface and first compensation film lower surface have triangular cross sections and the second compensation film upper surface and second compensation film lower surface have triangular cross sections.

22. The liquid crystal display device of claim 19, wherein a width of the first compensation film does not vary.

23. The liquid crystal display device of claim 19, wherein a tilt angle of the discotic liquid crystal is parallel to a surface of the compensation film.

24. The liquid crystal display device of claim 19, wherein a width of the first compensation film does vary.

* * * * *